United States Patent [19]
Hammond

[11] Patent Number: 5,785,884
[45] Date of Patent: Jul. 28, 1998

[54] REVERSIBLE LIQUID/SOLID PHASE CHANGE COMPOSITIONS

[75] Inventor: Michael J. Hammond, Indianapolis, Ind.

[73] Assignee: Store Heat and Produce Energy, Inc., Indianapolis, Ind.

[21] Appl. No.: 589,927

[22] Filed: Jan. 23, 1996

[51] Int. Cl.⁶ .................................................. C09K 5/06
[52] U.S. Cl. ............................................................ 252/70
[58] Field of Search .............................................. 252/70

[56] References Cited

U.S. PATENT DOCUMENTS

| | | | |
|---|---|---|---|
| 4,271,029 | 6/1981 | Lane et al. | 252/70 |
| 4,272,391 | 6/1981 | Lane et al. | 252/70 |
| 4,272,392 | 6/1981 | Lane et al. | 252/70 |
| 4,273,666 | 6/1981 | Lane et al. | 252/70 |
| 4,283,298 | 8/1981 | Lane et al. | 252/70 |

FOREIGN PATENT DOCUMENTS

| | | |
|---|---|---|
| 0365623 | 11/1993 | United Kingdom . |
| 89/9249 | 3/1989 | WIPO .................. 252/70 |

*Primary Examiner*—Melissa Bonner
*Attorney, Agent, or Firm*—Woodard, Emhardt, Naughton, Moriarty & McNett

[57] ABSTRACT

Eutectic compositions of hydrated magnesium nitrate and either or both of sodium and potassium nitrate are described, and are useful as reversible liquid/solid phase change materials.

8 Claims, 2 Drawing Sheets

REVERSIBLE LIQUID/SOLID PHASE CHANGE COMPOSITIONS

FIELD OF THE INVENTION

The present invention relates to novel liquid/solid phase change compositions. More particularly, the invention relates to such phase change compositions comprising hydrated magnesium nitrate in combination with either or both of sodium nitrate and potassium nitrate.

BACKGROUND OF THE INVENTION

As further background, recent developments in the storage of thermal energy have involved the use of so-called phase change compositions. These phase change compositions are often eutectics which release or absorb substantial quantities of heat while undergoing phase transition between liquid and solid states.

For example, $Mg(NO_3)_2 \cdot 6H_2O$ (magnesium nitrate hexahydrate) is known to undergo a phase transition at about 89° C., thereby releasing or absorbing a substantial quantity of latent heat of fusion. As such this material has been studied as a phase change material, leading to the development of a number of compositions including magnesium nitrate hexahydrate along with one or more nucleators such as MgO, $Mg(OH)_2$, $MgCO_3$, CaO, $Ca(OH)_2$, and $CaCO_3$ (see e.g. U.S. Pat. No. 4,272,391); or $MgSO_4$, $CaSO4$, $CuSO_4$, $NiSO_4$, $CoSO_4$ and/or $ZnSO_4$ (see U.S. Pat. No. 4,271,029). Other, eutectic compositions having effective phase change properties have been developed, including for instance a hydrated $Mg(NO_3)_2/NH_4NO_3$ based compositions (see U.S. Pat. No. 4,283,298) and hydrated $Mg(NO_3)_2/MgCl_2$ based compositions (see U.S. Pat. No. 4,272,392). For additional information as to eutectics useful as phase change compositions, reference can be made to Yoneda et al. *SOLAR ENERGY* 21 61–3 (1978).

Despite prior efforts, phase change materials have yet to gain wide-spread use in industry. Additional phase change materials are needed which are effective at various temperature ranges not previously available, for example those suited for use in industries related to food preparation and space conditioning. The present invention addresses this need.

SUMMARY OF THE INVENTION

Novel eutectic compositions have been discovered which comprise hydrated magnesium nitrate in combination with either or both of sodium nitrate and potassium nitrate. These materials exhibit melting points in the range of 60° C. to 85° C. and are useful for storing and releasing thermal energy for use in the food, space conditioning and other industries.

One preferred embodiment of the invention thus provides a reversible liquid/solid phase change composition which comprises a substantially eutectic binary mixture containing hydrated magnesium nitrate and sodium nitrate. In a preferred form, this binary mixture is comprised of about 6 to about 9 weight percent sodium nitrate and about 91 to about 94 weight percent hydrated magnesium nitrate, and exhibits a melting point of about 83° C.

Another preferred embodiment of the invention provides a reversible liquid/solid phase change composition which includes a substantially eutectic binary mixture containing hydrated magnesium nitrate and potassium nitrate. The binary mixture is advantageously comprised of about 24 to about 26 weight percent potassium nitrate and about 74 to about 76 weight percent hydrated magnesium nitrate, and has a melting point of about 71° C.

Still another preferred embodiment of the invention provides a reversible liquid/solid phase change composition which comprises a substantially eutectic ternary mixture of hydrated magnesium nitrate, sodium nitrate, and potassium nitrate. More preferred compositions are provided where the ternary mixture is comprised of about 6 to about 8 weight percent sodium nitrate, about 23 to about 26 weight percent potassium nitrate and about 67 to about 71 weight percent hydrated magnesium nitrate, and wherein the ternary mixture has a melting point of about 65° C.

Still further preferred compositions of the invention are provided wherein the above-described compositions also contain one or more nucleators, advantageously including magnesium hydroxide, which reduce or eliminate supercooling of the mixtures.

Compositions of the invention provide phase change materials which are useful for example in the food, automotive and space conditioning industries. The compositions can be readily formed using inexpensive and widely available materials. In addition, the preferred compositions are formed from mixtures of nitrate salts, thus avoiding potential compositional changes resulting from exchange reactions. Additional objects, features and advantages of the invention will be apparent from the following description.

DESCRIPTION OF THE PREFERRED EMBODIMENTS

Figure 1:
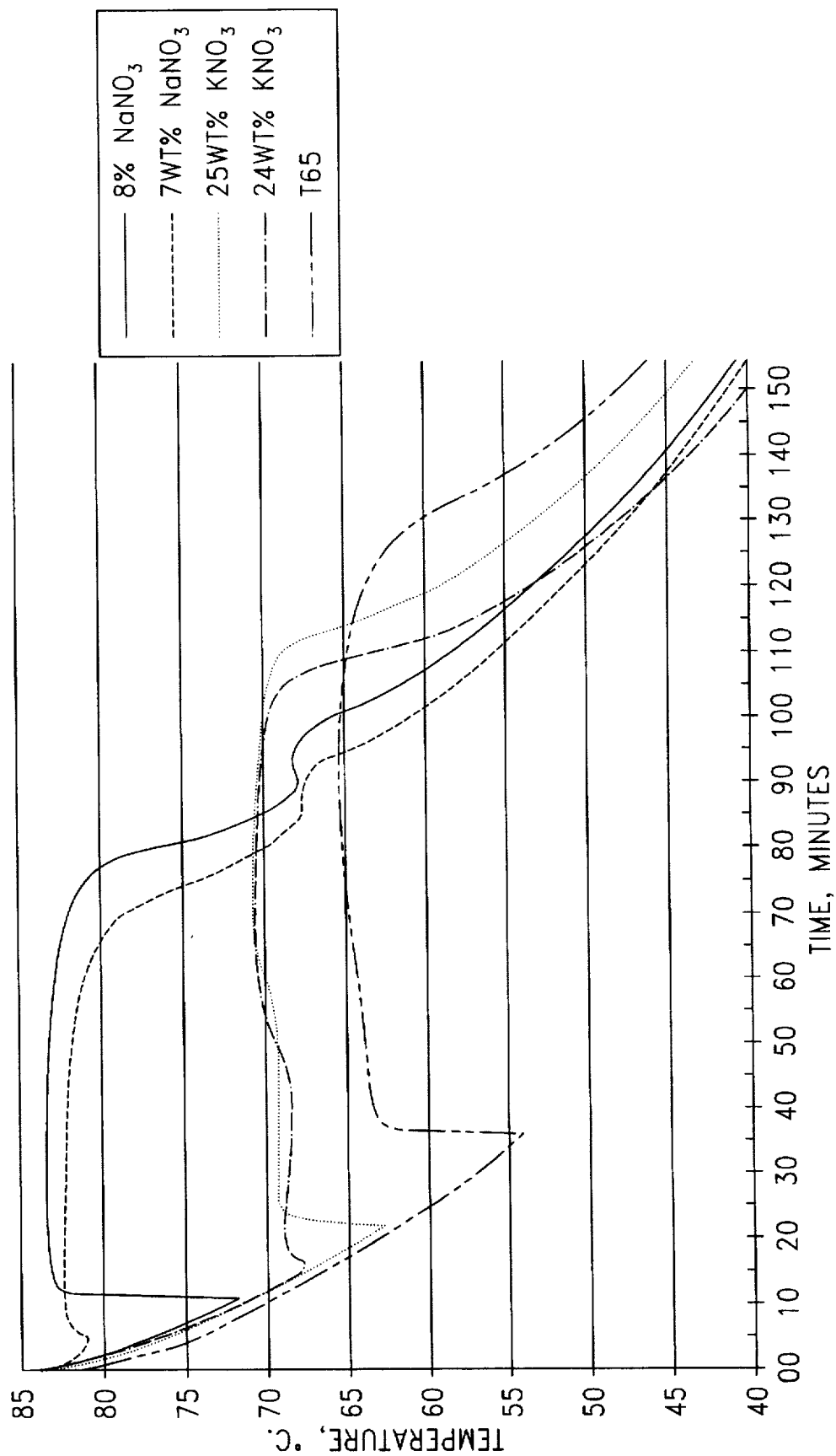
FIG. 1 is a graph of temperature verses time (minutes) for compositions of the invention as further described in the Examples 1–3 below.

For the purposes of promoting an understanding of the principles of the invention, reference will now be made to certain embodiments thereof and specific language will be used to describe the same. It will nevertheless be understood that no limitation of the scope of the invention is thereby intended, such alterations, modifications and further applications of the principles of the invention as illustrated herein being contemplated as would normally occur to one skilled in the art to which the invention relates.

As disclosed above, the present invention provides new reversible liquid/solid phase change materials which comprise substantially eutectic mixtures of hydrated magnesium nitrate with either or both of sodium nitrate and potassium nitrate. In this regard, the term "hydrated magnesium nitrate" as used herein is intended to mean a hydrated form of magnesium nitrate which is comprised principally of $Mg(NO_3)_2 \cdot 6H_2O$ (magnesium nitrate hexahydrate) but which may upon assay be slightly off stoichiometry in water as is well known to occur in industry. The term "eutectic" is used herein in its known sense, to refer to a composition which includes two or more components and which has a definite and minimum melting point. Eutectics in accordance with the invention will exhibit a substantial plateau in their freezing curves (temperature plotted vs. time) at their melt/freeze temperature, a characteristic well known and recognized by those practiced in the area.

The term "substantially eutectic" is used herein to refer to a mixture which exhibits at least substantial characteristics of a eutectoid, but which may contain the respective components in a ratio which varies slightly from those which provide the optimal eutectic composition. Thus, materials which are substantially eutectic may exhibit some temperature variation (e.g. about 2° C. or less) during phase transition, and may begin phase transition at a temperature which varies slightly (e.g. up to about 220 C.) from that of the optimal eutectic mixture of the components. Such materials exhibiting at least substantially eutectic characteristics will nonetheless be useful in the storage and release of thermal energy and are considered to be within the spirit and scope of the present invention.

Preferred compositions of the invention will be comprised of binary or ternary mixtures as discussed further below. In this regard, percentages used herein to describe the relative amounts of hydrated magnesium nitrate, potassium nitrate and sodium nitrate, are exclusive of any additives (nucleators) or impurities present. With this in mind, one more preferred phase change composition of the invention is comprised of a binary mixture containing about 6 to about 9 weight percent sodium nitrate and about 91 to about 94 weight percent hydrated magnesium nitrate. Preferred mixtures in this range have a melting point of about 83° C.

Another of the preferred inventive compositions is comprised of a binary mixture which contains about 24 to about 26 weight percent potassium nitrate and about 74 to about 76 weight percent hydrated magnesium nitrate. Preferred mixtures of this type have a melting point of about 71° C. And, still another of the preferred compositions is comprised of a ternary mixture which contains about 6 to about 8 weight percent sodium nitrate, about 23 to about 26 weight percent potassium nitrate and about 67 to about 71 weight percent hydrated magnesium nitrate. Preferred such mixtures melt at a temperature of about 65° C.

Eutectic compositions in accordance with the present invention may also comprise additives which serve as nucleators to suppress supercooling, preferably suppressing average supercooling of the compositions to about 2° C. or less. Supercooling refers to a phenomenon in which a material cools to a temperature below its freezing point while remaining in a metastable, liquid state. Many nucleators are known for phase change materials and have for example been reported in the patents cited above. These may be evaluated for efficacy in the present eutectics using standard techniques over repetitive phase change or "cycling" of the eutectics. $Mg(OH)_2$ (magnesium hydroxide) has served advantageously as a nucleator in work to date in amounts as low as 0.05 weight percent of the overall composition, although higher amounts can also be used if desired. Preferably, though, the nucleator will be included in an amount not exceeding about 2 weight percent of the eutectic composition.

In use, compositions of the invention can be hermetically contained in an encapsulating means formed with a material impervious to the compositions. The resulting encapsulated devices also form a part of the present invention. For example, known encapsulations include water impervious plastic/metal laminates, closed cell plastic foams, metal or plastic cans or containers, metal or plastic pipe such as extruded polyethylene pipe, and the like. Additional information as to such encapsulating means may be found in Report Nos. ORO/5217-8 and NSF RANN SE C906 FR 76 1, available from the National Technical Information Service, Springfield, Va., U.S.A.

For the purpose of promoting a further understanding and appreciation of the present invention and its features and advantages, the following specific Examples are given. It will be understood that these Examples are illustrative, and not limiting, of the invention.

EXAMPLE 1

Two compositions were formed by dissolving sodium nitrate in liquid magnesium nitrate hexahydrate to form respective solutions containing 7 weight percent and 8 weight percent sodium nitrate. Typical freeze curves for these compositions are shown in FIG. 1, and are denoted "7% $NaNO_3$" and "8% $NaNO_3$", respectively. These freeze curves exhibit substantial plateaus at a melting/freezing temperature of about 82° C.–83° C.

EXAMPLE 2

Two compositions were formed by dissolving potassium nitrate in liquid magnesium nitrate hexahydrate to yield respective solutions containing about containing 24 weight percent and 25 weight percent potassium nitrate. The freeze curves for these compositions are given in FIG. 1 (denoted as "24% $KNO_3$" and "25% KNO3") and indicate that the eutectic melts at about 71° C.

EXAMPLE 3

A ternary system containing about 6.5 weight percent sodium nitrate, about 24.1 weight percent potassium nitrate and about 69.4 weight percent magnesium nitrate hexahydrate was prepared. A typical freeze curve for this mixture is shown in FIG. 1 (denote "T65"). As can be seen from the freeze curve, a substantial plateau is exhibited during phase change of the material at about 65° C.

EXAMPLES 4–6

Figure 2:
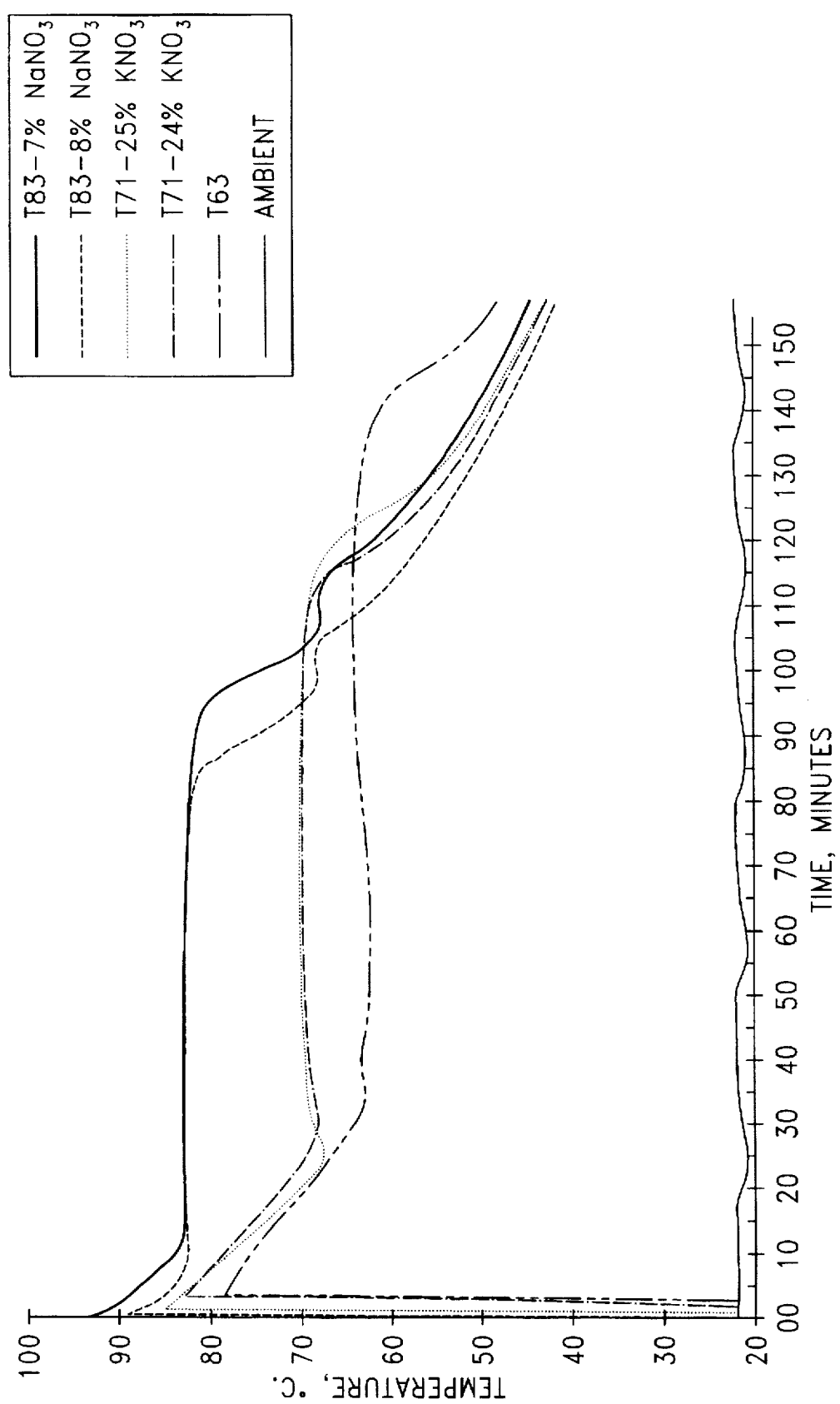
FIG. 2 is a graph of temperature verses time (minutes) for compositions of the invention as further described in the Examples 4–6 below.

In these Examples compositions prepared as described in Examples 1–3 were modified by the addition of 0.1 weight percent of magnesium hydroxide to serve as a nucleator. Freeze curves for these materials were taken and are shown in FIG. 2. A comparison of these curves to those in FIG. 1 illustrates that magnesium hydroxide is an effective nucleator which prevents or reduces supercooling of the compositions.

All publications herein cited are illustrative of the level of ordinary skill in the art and are hereby incorporated by reference in their entirety as if each had been individually incorporated by reference and fully set forth.

While the invention has been illustrated and described in detail in the foregoing description, the same is to be considered as illustrative and not restrictive in character, it being understood that only the preferred embodiment has been shown and described and that all changes and modifications that come within the spirit of the invention are desired to be protected.

What is claimed is:

1. A reversible liquid/solid phase change composition comprising a substantially eutectic ternary mixture of magnesium nitrate hexahydrate, sodium nitrate, and potassium nitrate.

2. The composition of claim 1 wherein said ternary mixture is comprised of about 6 to about 8 weight percent sodium nitrate, about 23 to about 26 weight percent potassium nitrate and about 67 to about 71 weight percent hydrated magnesium nitrate.

3. The composition of claim 2 which has a melting point of about 65° C.

4. The composition of claim 1 and also comprising a nucleator.

5. The composition of claim 2 and also comprising a nucleator.

6. The composition of claim 4 wherein said nucleator is magnesium hydroxide.

7. The composition of claim 5 wherein said nucleator is magnesium hydroxide.

8. A method for storing and releasing thermal energy, comprising:

charging a reversible liquid/solid phase change composition according to claim 1 with thermal energy, said charging including bringing said composition to a temperature above about 65° C. so as to melt said composition; and, thereafter allowing said composition to release thermal energy.

* * * * *

UNITED STATES PATENT AND TRADEMARK OFFICE
CERTIFICATE OF CORRECTION

PATENT NO : 5,785,884
DATED : July 28, 1998
INVENTOR(S): Michael J. Hammond

It is certified that error appears in the above-identified patent and that said Letters Patent is hereby corrected as shown below:

In col. 4, line 27, please delete "denote" and insert in lieu thereof --denoted--.

Signed and Sealed this

Eleventh Day of May, 1999

Attest:

Q. TODD DICKINSON

Attesting Officer

Acting Commissioner of Patents and Trademarks